Figure 1:
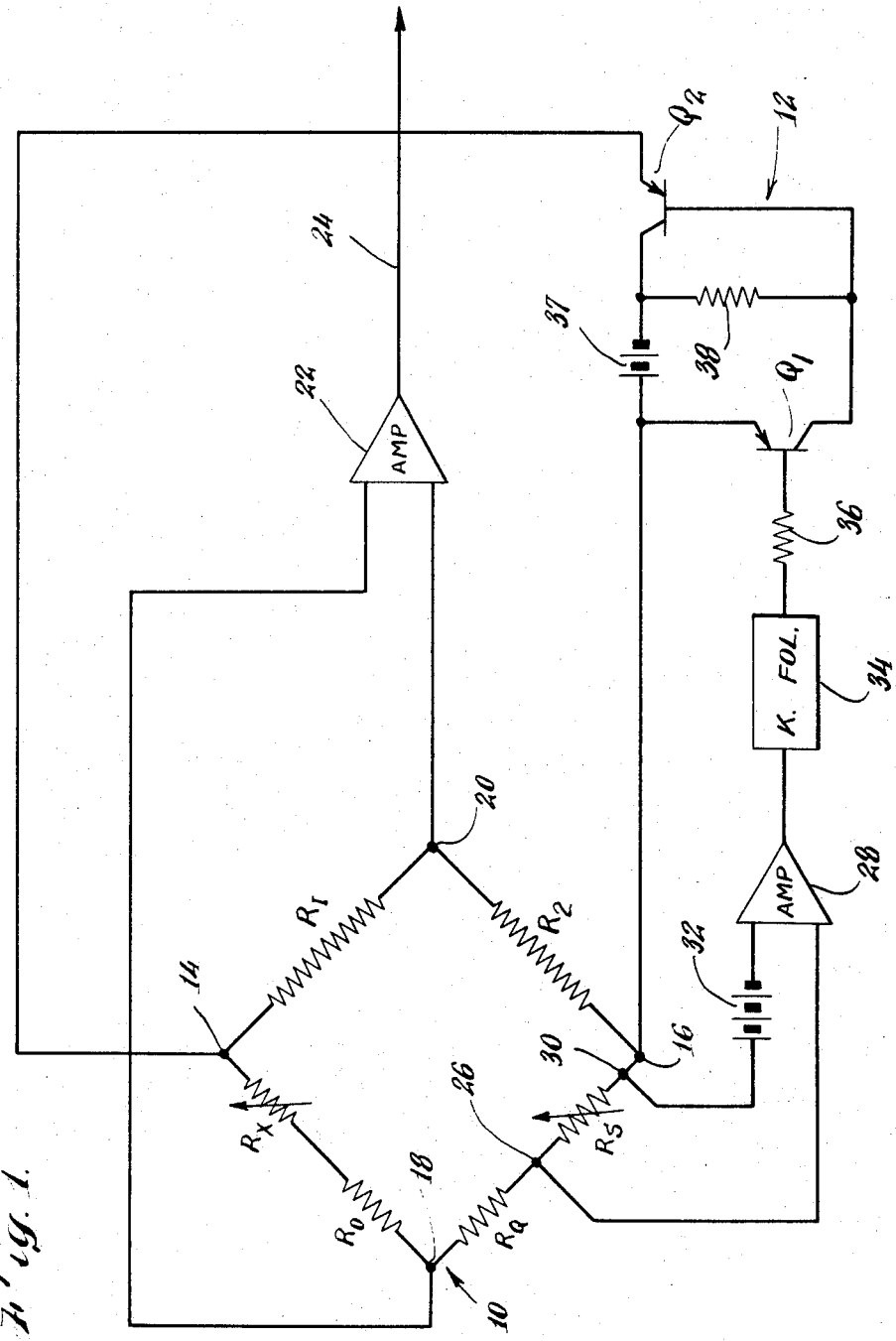

Dec. 10, 1968  H. H. CLINTON  3,416,076
VOLTAGE REGULATING MEANS FOR IMPEDANCE BRIDGE MEASURING CIRCUITS
Filed June 1, 1966  2 Sheets-Sheet 1

INVENTOR.
Henry H. Clinton
BY
Blair, Buckles & Cesari
HIS ATTORNEYS.

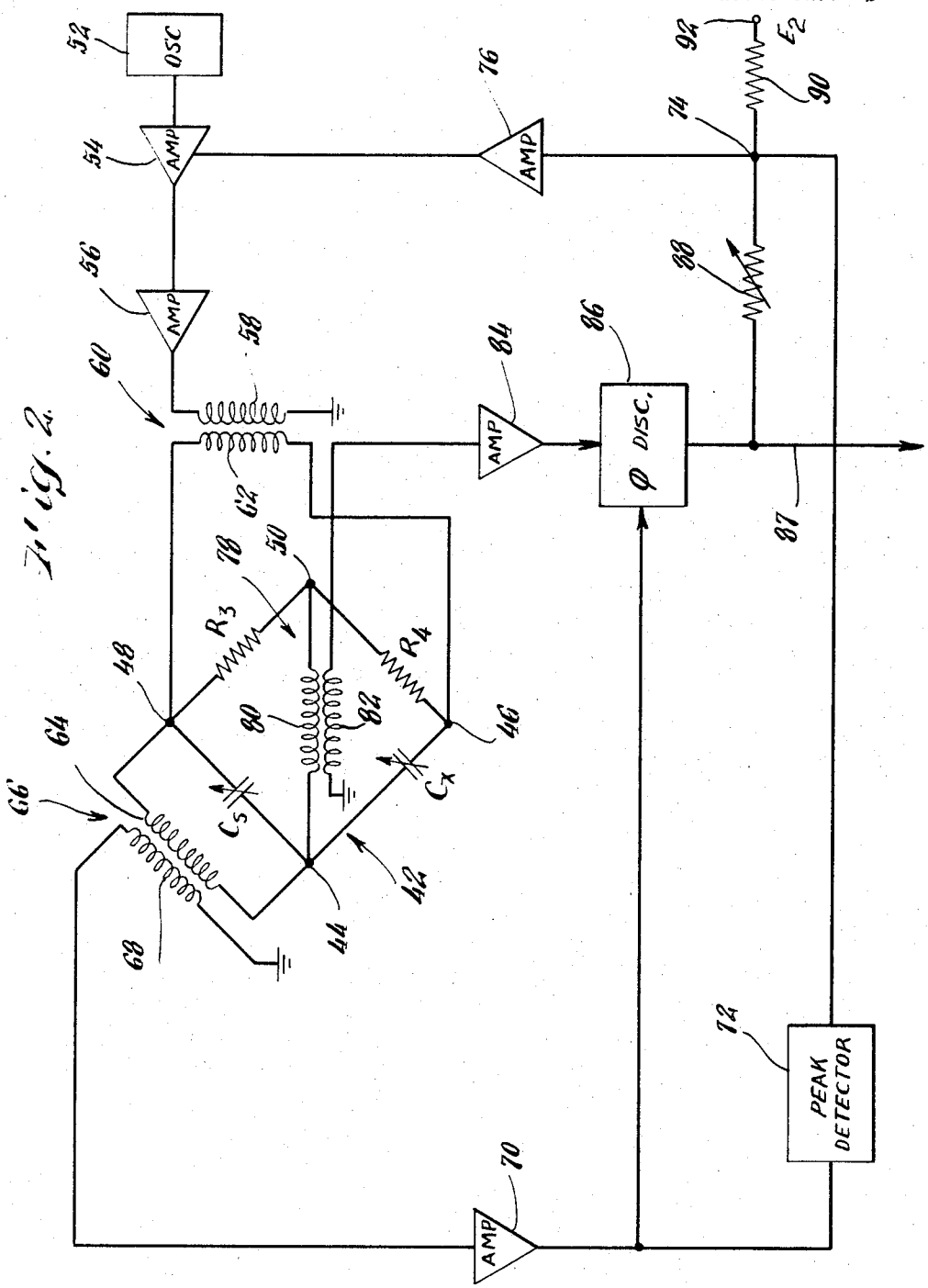

United States Patent Office 3,416,076
Patented Dec. 10, 1968

3,416,076
VOLTAGE REGULATING MEANS FOR IMPEDANCE BRIDGE MEASURING CIRCUITS
Henry H. Clinton, Ridgewood, Clinton, Conn., assignor to The Whitney Blake Company, New Haven, Conn.
Filed June 1, 1966, Ser. No. 554,470
11 Claims. (Cl. 324—57)

The present invention relates to circuits for measuring electrical parameters. More particularly, it relates to electrical bridge circuits providing signal outputs bearing a linear relationship to unknown electrical parameters of bridge circuit elements. In one embodiment of my invention, the unknown electrical parameter to be ascertained is resistance, while in a second embodiment the unknown electrical parameter is capacitance.

The signal outputs of typical A.C. and D.C. bridge circuits are inherently non-linear functions. That is, the relationship between the unknown electrical parameter of a bridge circuit element and the signal output is not a linear function. Since the solution for the unknown parameter under unbalanced bridge conditions, when the bridge output signal is other than zero, is quite complicated, the general practice is to adjust the bridge circuit so as to achieve a balanced condition. This is accomplished by varying a known electrical parameter in another bridge arm until the bridge output signal goes to zero. Having achieved a null or balanced bridge condition, the unknown parameter can be readily determined on the basis of the known parameter in the other bridge arm.

Unfortunately, this technique is time consuming and does not conveniently lend itself to being performed automatically. A sophisticated electrical or electronic feedback loop responsive to the bridge output signal is required to rebalance the bridge if the manual adjustment step is to be eliminated. The parameter which was electromechanically or electronically adjusted to achieve bridge balance may be monitored and a signal related thereto processed in order to obtain a direct reading of the unknown parameter. This automated technique is expensive and may not be acceptably accurate, since precise bridge balance cannot be readily achieved.

It would be preferred to use the bridge output signal as a direct measure of the unknown parameter rather than to resort to bridge rebalancing techniques. However, as noted above, the relationship between the unknown bridge parameter and the bridge output signal is not a simple one. Consequently, sophisticated analog signal processing techniques are required in order to conveniently determine the unknown bridge parameter directly from the bridge output signal. For example, if a linear relationship between the bridge output signal magnitude and the unknown bridge parameter is established, the bridge output signal can be readily metered to provide a direct reading of the unknown parameter. Then too, using conventional signal conversion techniques, the bridge output signal magnitude could be printed out by a printer directly in terms of the unknown bridge parameter or in terms of deviation from a predetermined nominal value. This could be used to advantage by manufacturers of electrical circuit components, wire and cable manufacturers, etc., as a check on their manufacturing processes.

Accordingly, it is an object of the present invention to provide electrical circuits for measuring unknown electrical parameters.

An additional object is to provide electrical circuits of the above character which are capable of operating automatically to measure unknown electrical parameters.

A further object is to provide electrical circuits of the above character in which an element having an unknown electrical parameter to be determined is connected in one arm of a bridge network.

Another object is to provide electrical circuits of the above character for providing a bridge output signal as a measure of the electrical parameter to be determined.

Still another object is to provide a bridge network and associated electrical circuitry of the above character wherein the bridge output signal bears a linear relationship to the unknown electrical parameter of a bridge circuit element.

Yet another object is to provide a bridge network and associated electrical circuitry of the above character wherein the unknown parameter is determined without having to balance the bridge network.

Still another object is to provide circuitry of the above character which is inexpensive and simple in design, and which can operate rapidly to determine the magnitudes of unknown electrical parameters.

A further object is to provide electrical circuitry of the above character adapted to determine the resistance of a circuit element connected in the bridge network.

An additional object is to provide circuitry of the above character adapted to determine the capacitance of a circuit element connected in the bridge network.

Other objects of the invention will in part be obvious and will in part appear hereinafter.

The invention accordingly comprises the features of construction, combinations of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawing in which:

FIGURE 1 is a detailed circuit diagram, partially in block diagram form, of an embodiment of my invention adapted to determining resistance; and FIGURE 2 is a detailed circuit diagram, partially in block diagram form, of a second embodiment of my invention adapted to determining capacitance.

Broadly stated, the present invention resides in selectively and automatically controlling the excitation of a bridge network containing a circuit element whose parameter is unknown and a reference or standard circuit element. According to the invention bridge excitation is adjustably controlled so as to regulate the voltage developed across the standard bridge circuit element in a predetermined manner. As a result, the bridge output signal magnitude bears a linear relationship to the parameter of the bridge circuit element to be determined. Thus, the bridge output signal magnitude may be directly employed as a measure of the unknown parameter.

In one embodiment of my invention, the unknown parameter to be determined is resistance. The bridge excitation is automatically adjustably controlled so as to hold the voltage across the standard bridge circuit element to a constant magnitude and thereby linearize the bridge output signal.

In a second embodiment of my invention, the unknown parameter to be determined is capacitance. The bridge excitation is automatically adjustably controlled such that the magnitude of the voltage across the standard bridge circuit element is held to a value equal to a constant plus a predetermined factor of the bridge output signal magnitude. As a result, the bridge output signal magnitude bears a linear relationship to the capacitive parameter to be determined.

Referring now to FIGURE 1, a bridge network, generally indicated at 10, is energized from a controllable current source, generally indicated at 12, connected across bridge input terminals 14 and 16. The bridge output signal appearing across bridge output terminals 18 and 20 is suitably amplified in a conventional D.C. operational amplifier 22 and appears on output line 24 as the signal output of interest.

One arm of the bridge network 10 includes a compensating resistor $R_q$ and a standard resistor $R_s$ connected in series between bridge terminals 18 and 16. A resistor $R_0$ and an unknown resistor $R_x$ are connected in series between bridge terminals 18 and 14 to constitute a second arm of the bridge network 10. The remaining bridge arms are provided by a resistor $R_1$ connected between bridge terminals 14 and 20, and resistor $R_2$ connected between bridge terminals 20 and 16. The resistor $R_0$ is included to represent the effective lead resistance in the unknown resistor $R_x$. In situations where successive resistance measurements are taken of a plurality of unknown resistors $R_x$ which are successively connected into the arm of the bridge network 10 through a switching network, the effective lead resistance represented by resistor $R_0$ can become a significant factor. The resistor $R_q$ is therefore included in the bridge arm with the standard resistor $R_s$ in order to compensate for this lead resistance which is a readily determinable and an essentially constant resistance factor.

As will be seen from the derivation set out below, in order to linearize the bridge output signal appearing across bridge output terminals 18, 20, the voltage $E_s$ across the standard resistor $R_s$ must be held constant. To accomplish this, the junction 26 between the standard resistor $R_s$ and the compensating resistor $R_q$ is connected to one input of a conventional D.C. operational amplifier 28. The other terminal of the standard resistor $R_s$, indicated at 30, is connected to the positive terminal of a standard voltage source 32. The negative terminal of the voltage source 32 is connected to the other input of the amplifier 28. The voltage $E_s$ is compared with the voltage magnitude of the standard voltage source 32, and the difference voltage is amplified in the amplifier 28. The amplified difference voltage appearing at the output of the amplifier 28 is applied through a cathode follower 34 to the control input of the bridge current source 12. The cathode follower 34 serves as isolating means to prevent any significant bridge current flow in the control loop constituted by the amplifier 28, the cathode follower 34, and the controllable bridge current source 12.

The controllable current source 12 includes a resistor 36 connecting the output of the cathode follower 34 to the base of a transistor $Q_1$. The collector of transistor $Q_1$ is connected to the base of a series current regulating transistor $Q_2$. The emitter of transistor $Q_2$ is connected to bridge input terminal 14 while its collector is connected to the negative terminal of a source 37 supplying the bridge current. The positive terminal of the source 37 is connected to the bridge input terminal 16 and also to the emitter of transistor $Q_1$. A biasing resistor 38 is connected between the collector and base of the transistor $Q_2$.

It will thus be seen that if the voltage $E_s$ across the standard resistor $R_s$ exceeds the standard voltage of the source 32, the conductance of the series regulating transistor $Q_2$ is reduced until the output of the amplifier 28 is effectively zero volts. Conversely, if the standard voltage of the source 32 exceeds the voltage $E_s$ across the standard resistor $R_s$, the conductance of the series regulating transistor $Q_2$ is increased until the output of amplifier 28 is again effectively zero volts.

That the bridge output signal appearing across terminals 18 and 20 is linearized by maintaining the voltage drop $E_s$ across the standard resistor $R_s$ constant can be seen from the following derivation.

Let
$$K_2 = R_1/R_2$$
where $R_1$ = resitance of resistor $R_1$, and
$R_2$ = resistance of resistor $R_2$.

Let
$$K_1 = \frac{R_x - R_{xnom}}{R_{xnom}}$$

where $R_x$ = resistance of unknown resistor $R_x$,
$R_{xnom}$ = nominal resistance value of resistor $R_x$,
$K_1$ = percent deviation of unknown resistance from nominal At bridge balance $K_1$ equals 0 and $R_x$ equals $R_{xnom}$. Choose $R_1/R_2$ to equal $R_{xnom}/R_s$ and also to equal $R_0/R_s$, where $R_0$ is the lead resistance and $R_q$ is the compensating resistance. $R_x$ can then be expressed as $$R_x = K_2 R_s (1 - K_1)$$

Summing the voltage drops in the bridge arms containing the unknown resistor $R_x$ and the standard resistor $R_s$ we have $$E_1 = E_s \left[ 1 + \frac{R_x}{R_s} + \frac{R_0 + R_p}{R_s} \right]$$

$$= E_s \left[ 1 + K_2(1 + K_1) + \frac{R_0}{R_s}\left(1 + \frac{1}{K_2}\right) \right]$$

where $E_1$ = voltage across bridge input terminals 14, 16, and
$E_s$ = voltage across resistor $R_s$.

The voltage across resistor $R_2$ can be expressed as $$E_{R_2} = \frac{R_2 E_1}{R_1 + R_2} = \frac{E_1}{1 + K_2}$$

The output signal voltage $E_0$ across bridge terminals 18, 20 is $$E_0 = E_s \left(1 + \frac{R_q}{R_s}\right) - E_{R_2}$$

$$= E_s \left[1 + \frac{R_q}{R_s}\right] - \frac{E_1}{1 + K_2}$$

$$= E_s \left[1 + \frac{R_q}{R_s}\right] - \frac{E_s \left[1 + K_2(1+K_1) + \frac{R_0}{R_s}\left(1 + \frac{1}{K_2}\right)\right]}{1 + K_2}$$

This expression can be reduced to $$E_0 = E_s \left[\frac{-K_1 K_2}{1 + K_2}\right]$$

If the factor $E_s$ is held constant, it is seen that the output signal voltage $E_0$ is directly proportional to $K_1$ or $$\frac{R_x - R_{xnom}}{R_{xnom}}$$

and thus directly proportional to the percentage deviation of the unknown resistance $R_x$ from the nominal resistance value $R_{xnom}$.

Having linearized the bridge output signal $E_0$, it will be appreciated that this signal may be supplied to conventional voltage metering devices calibrated in terms of percentage deviation from a nominal resistance value or in terms of ohms directly. The bridge circuit of FIGURE 1 thus becomes a valuable test tool in the manufacture of resistors, electrical wire and cable, etc., for determining whether the actual resistance value of the product comes within acceptable tolerances of the rated or nominal resistance value. The resistor $R_s$ is variable to accommodate variations in the nominal resistance value $R_{xnom}$. It will be further appreciated that the linearized bridge output signal $E_0$ could be processed by suitable signal conversions circuitry such as a voltage to frequency converter whose output is connected to a printer. Thus, the unknown resistance $R_x$ could be printed out numerically in terms of percentage deviation from nominal resistance or directly in ohms.

Referring now to FIGURE 2 a bridge network, generally indicated at 42, is adapted to measure the capacitance of an unknown capacitor $C_x$. This unknown capacitance $C_x$ is connected in one arm of the bridge network 42 between bridge terminals 44 and 46. A standard capacitor $C_s$ is connected in a second bridge arm between bridge terminals 44 and 48. The remaining two arms of the bridge network 42 are constituted by a resistor $R_3$, connected between bridge terminals 48 and 50, and a resistor $R_4$ connected between bridge terminals 46 and 50.

The bridge network 42 is energized from an oscillator 52 supplying its output to a gain controlled amplifier 54. The output of amplifier 54 is fed to a current amplifier 56 whose output drives the primary winding 58 of a transformer, generally indicated at 60. One side of primary winding 58 is grounded. The secondary winding 62 of transformer 60 is connected across the input terminals 48 and 46 of the bridge network 42.

In order to monitor the voltage $E_s$ developed across the standard capacitor $C_s$, a primary winding 64 of a transformer, generally indicated at 66, is connected across bridge terminals 44 and 48. The primary winding 64 is preferably of a very high impedance relative to the standard capacitor $C_s$. One side of the secondary winding 68 of transformer 66 is grounded while its other side is connected to the input of a gain stable amplifier 70 to boost the signal level induced in the secondary winding. The output of the amplifier 70 is fed to a peak detector 72 which, in turn, develops a D.C. signal proportional in magnitude to the A.C. signal at the output of amplifier 70. This D.C. signal level at the output of the peak detector 72 is supplied to a summing junction 74. Summing junction 74 is connected to the input of a D.C. operational amplifier 76 whose output is used to control the gain of the amplifier 54.

An output transformer, generally indicated at 78, includes a primary winding 80 connected across the output terminals 44 and 50 of the bridge network 42. Transformer 78, like transformers 60 and 66, is preferably a conventionally designed bridge transformer including appropriate electrostatic shielding provisions, etc. The secondary winding 82 of the output transformer 78 has one side grounded and its other side connected to the input of an operational amplifier 84 operating at very low gain. The output of the amplifier 84 is applied to an input of a linear phase sensitive discriminator 86 which also derives a reference signal from the output of amplifier 70. The output of the discriminator 86 on line 87 constitutes the useful output signal of the apparatus.

A portion of the D.C. output signal from the discriminator 86 is fed back through a resistor 88 to the summing junction 74. Also connected to the summing junction 74 by way of a resistor 90 is a terminal 92 to which is applied a reference voltage $E_2$. It will thus be seen that the gain of amplifier 54 is controlled according to three factors, to wit, the magnitude of the voltage $E_s$ derived from the output of the peak detector 72, the bridge output signal derived from the output of the phase discriminator 86, and the reference voltage $E_2$.

That the circuitry disclosed in FIGURE 2 can be operated so as to linearize the bridge output signal $E_0$ appearing across bridge output terminals 44 and 50 is demonstrated by the following derivations. Assume that (1) $$\frac{C_{xnom}}{C_s} = \frac{R_3}{R_4} = \frac{1}{K_3}$$

where $C_{xnom}$ = nominal capacitance value of capacitor $C_x$,
$C_s$ = capacitance of standard capacitor $C_s$,
$R_3$ = resistance of resistor $R_3$, and
$R_4$ = resistance of resistor $R_4$;

(2) $$C_x = C_{xnom} + K_4 C_{xnom} = \frac{C_s}{K_3}(1+K_4)$$

where $K_4 = \dfrac{C_x - C_{xnom}}{C_{xnom}}$ = percent deviation of the capacitance of $C_x$ from nominal; and (3) $$E_s = E_2 + K_2 E_0$$

where $E_s$ = voltage across standard capacitor $C_s$, and
$E_2$ = reference voltage applied to terminal 92.

$C_x$ can then be expressed as $$C_x = \frac{C_s}{K_3} + \frac{K_4 C_s}{K_3} = \frac{C_s(1+K_4)}{K_3}$$

The input voltage $E_1$ across bridge terminals 48 and 46 can be expressed as $$E_1 = E_s + E_s \frac{C_s}{C_x} = E_s\left(1 + \frac{K_3}{1+K_4}\right)$$

$$= (E_2 + K_2 E_0)\left(1 + \frac{K_3}{1+K_4}\right)$$

The output signal voltage $E_0$ is $$E_0 = E_s - \frac{R_1 E_3}{R_3 + R_4} = E_2 + K_2 E_0 - \frac{E_1}{1+K_3}$$

Substituting for $E_1$ above and simplifying, we obtain $$E_0 = \frac{E_2 K_3 K_4}{1 + K_3 + K_4 + K_3 K_4 - K_2 K_3 K_4}$$

or $$\frac{E_0}{E_2} = \frac{K_3 K_4}{1 + K_3 + K_4 + K_3 K_4 - K_2 K_3 K_4}$$

Letting $K_5 = 1 + K_3 + K_4 + K_3 K_4 - K_2 K_3 K_4$, then $$K_2 = \frac{1 + K_3 + K_4 + K_3 K_4 - K_5}{K_3 K_4}$$

$$= \frac{1}{K_3 K_4} + \frac{1}{K_4} + \frac{1}{K_3} + 1 - \frac{K_5}{K_3 K_4}$$

If $$\frac{K_5}{K_3 K_4} = \frac{1}{K_4} + \frac{1}{K_3 K_4}$$

then $$K_5 = K_3 + 1$$

and $$K_2 = \frac{1}{K_3} + 1$$

where $K_2$ is a feedback factor.

Then $$E_0 = E_2 \left[ \frac{K_3 K_4}{K_3 + 1} \right]$$

$$= K_4 \left[ \frac{E_2 K_3}{K_3 + 1} \right]$$

where $E_2$ and $K_3$ are constants.

It is thus seen that the bridge output signal voltage $E_0$ is directly proportional to $K_4$, the percent deviation of the capacitance $C_x$ from nominal value. To achieve this linearization, the voltage $E_s$ across the standard capacitor $C_s$ must be held proportional to a constant, represented by the reference voltage $E_2$, and a factor of the bridge output voltage $E_0$, represented by $$K_2 = \frac{1}{K_3} + 1$$

the feedback factor. This control of $E_s$ is represented by the equation $$E_s = E_2 + E_0 \left[ \frac{1}{K_3} + 1 \right]$$

which was initially assumed in Equation 3 above.

In terms of the circuitry of FIGURE 2, the summing junction 74 combines the current flow, representing $E_s$, from the peak detector 72, the current flow, representing $$E_0 \left[ \frac{1}{K_3} + 1 \right]$$

from the discriminator 36, and the current flow from terminal 92 representing $E_2$. These combined currents serve to control the gain of amplifier 54 such that the voltage $E_s$ across the standard capacitor $C_s$ conforms to the relationship expressed in Equation 3 above. Some initial adjustment of resistor 88 is generally required to linearize the bridge network 42. The capacitor $C_s$ is variable to accommodate variations in the nominal capacitance value $C_{xnom}$.

The signal output on line 87 from the discriminator 86 thus constitutes a direct measure of the unknown capacitive parameter and may be employed to advantage in the same manner as the signal output from the resistance bridge of FIGURE 1. That is, this signal output may be metered directly or supplied to suitable electronic conversion circuitry and printed out by a printer in terms of percent deviation from nominal capacitance or in terms of capacitance.

It is readily appreciated that the embodiments of my invention disclosed in FIGURES 1 and 2 are capable of providing readings of the unknown resistive or capacitive parameters quite rapidly and without the necessity of rebalancing the bridge network. Thus, a greater number of circuit components can be tested in far less time. Each measurement can be carried out automatically and accurately, as can successive measurements through the provision of suitable switching means for switching into the bridge network a succession of circuit components.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described my invention, what I claim as new and desire to secure by Letters Patent is:

1. Apparatus for determining an unknown electrical parameter of an electrical component, said apparatus comprising, in combination,
   (A) a bridge network with the electrical component whose electrical parameter is to be determined connected in one arm thereof, said bridge network including
      (1) a pair of input terminals,
      (2) a pair of output terminals, and
      (3) a standard bridge circuit element connected in another arm thereof;
   (B) means connected to said bridge input terminals for energizing said bridge network; and
   (C) means responsive to the voltage directly across said standard bridge circuit element for controlling said energizing means so as to regulate the magnitude of said voltage across said standard bridge circuit element;
   (D) whereby the magnitude of a bridge output signal developed across said bridge output terminals bears a linear relationship to the unknown parameter of the electrical component.

2. The apparatus defined in claim 1 wherein the parameter of said standard bridge circuit element corresponding to the unknown parameter of said electrical component is adjustable to establish a nominal value of the unknown parameter, whereby said bridge output signal is proportional to the percent deviation of the unknown parameter from nominal.

3. The apparatus defined in claim 1 wherein the electrical parameter of the electrical component to be determined is resistance, and said standard bridge circuit element is a resistor.

4. The apparatus defined in claim 1 wherein the electrical parameter of the electrical component to be determined is capacitance, and said standard bridge circuit element is a capacitor.

5. The apparatus defined in claim 1 wherein said bridge network includes
   (4) resistors connected in the remaining arms thereof.

6. The apparatus defined in claim 3 wherein said responsive means operates to hold said voltage across said standard bridge circuit element to a constant magnitude.

7. The apparatus defined in clami 6 wherein said responsive means includes
   (1) a reference voltage to be compared with said voltage across said standard bridge circuit element,
   (2) an amplifier for amplifying the difference voltage therebetween,
   (3) a current source, and
   (4) series current regulating means for regulating the current supplied to said bridge network by said current source in accordance with said difference voltage,
   (5) whereby to cause said difference voltage to go to zero.

8. The apparatus defined in claim 6 wherein said bridge network further includes
   (4) a compensating resistor connected in the bridge arm with said standard bridge circuit element to compensate for the lead resistance of said electrical component.

9. The apparatus defined in claim 4 wherein said responsive means operates to hold said voltage across said standard bridge circuit element to a value equal to a predetermined constant plus a predetermined proportion of the magnitude of said bridge output signal.

10. The apparatus defined in claim 4 wherein said energizing means includes
  (1) an oscillator, and
  (2) a variable gain amplifier connected to the output of said oscillator,
    (a) the output of said amplifier coupled to said bridge input terminals.

11. The apparatus defined in claim 10 wherein said responsive means includes
  (1) a summing junction connected to supply a gain control signal to said amplifier,
  (2) a reference voltage connected to said summing junction,
  (3) a phase discriminator connected to receive said bridge output signal,
    (a) the output of said discriminator connected to said summing junction, and
  (4) a peak detector responsive to the voltage across said standard bridge circuit element,
    (a) the output of said peak detector connected to said summing junction.

References Cited

UNITED STATES PATENTS 2,437,449  3/1948  Ames et al. _____ 324—95
3,048,778  8/1962  Rumpel _____ 324—106

RUDOLPH V. ROLINEC, *Primary Examiner.*

E. E. KUBASIEWICZ, *Assistant Examiner.*

U.S. Cl. X.R.

324—62; 323—22

PO-1050
(5/69)

UNITED STATES PATENT OFFICE
CERTIFICATE OF CORRECTION

Patent No. 3,416,076   Dated December 10, 1968

Inventor(s) Henry H. Clinton

It is certified that error appears in the above-identified patent and that said Letters Patent are hereby corrected as shown below:

Column 4, line 41, "Rp" should be "--$R_q$--";
Column 8, line 51, "clami" should be --claim--.

SIGNED AND
SEALED

OCT 21 1969

(SEAL)
Attest:

Edward M. Fletcher, Jr.
Attesting Officer

WILLIAM E. SCHUYLER, JR.
Commissioner of Patents